United States Patent [19]
Goto et al.

[11] Patent Number: 4,590,330
[45] Date of Patent: May 20, 1986

[54] PRINTER

[75] Inventors: Takashi Goto, Tamayama; Katsuhiko Hirayama, Takizawa, both of Japan

[73] Assignee: Alps Electric Co., Ltd., Japan

[21] Appl. No.: 667,215

[22] Filed: Nov. 1, 1984

[30] Foreign Application Priority Data

Nov. 1, 1983 [JP] Japan ............................ 58-168455[U]

[51] Int. Cl.[4] .......................................... H04L 15/26
[52] U.S. Cl. .................................... 178/4; 178/17 D; 178/23 R
[58] Field of Search ........... 178/17 D, 17 B, 4, 4.1 R, 178/23 R, 25; 400/61

[56] References Cited
FOREIGN PATENT DOCUMENTS
182828 11/1982 Japan .

Primary Examiner—Stafford D. Schreyer
Attorney, Agent, or Firm—Guy W. Shoup

[57] ABSTRACT

A printer includes a carriage supporting a print head and movable across print paper for enabling the print head to print on the print paper, a fixed frame, a switch device mounted on one of the carriage and the fixed frame, the switch device being composed of a light transmission means and a light blocking means for blocking light passing through the light transmission means, a sensor means on the other of the carriage and the fixed frame for sensing light passing through the switch device to produce an electric signal, and a means for reading the electric signal as information indicative of printer functions in response to movement of the carriage.

3 Claims, 4 Drawing Figures

PRINTER

BACKGROUND OF THE INVENTION

The present invention relates to a printer capable of changing various functions thereof dependent on the speed (baud rate) of a received signal, the width of recording paper, and other data.

Printers have various selectable functions to meet the demands of users of the printers. For example, paper widths have to be changed to print on paper which is 11 inches or 12 inches wide.

It has been conventional practice to change printer functions by actuating a small changeover switch known as a DIP (dual in-line) switch mounted on a printed-circuit board disposed on the back of a printer which is concealed from external view.

FIG. 1 of the accompanying drawings illustrates such a DIP switch 1 for setting functions in a conventional printer. A pull-up resistor 2 serves to raise connector lines between the DIP switch 1 and a CPU 3 to a high level when the DIP switch 1 is open.

The conventional printer function changeover switch comprises such a DIP switch 1 mounted on a printed-circuit board disposed on the back of a printer, the switch being actuated each time by a fingertip or the tip of a bar. The DIP switch 1 is generally designed to directly select hardware functions, which are not necessarily in one-to-one correspondence to user's requests for functions.

For changeover operation on the DIP switch 1, it has been necessary to set ON or OFF positions one by one on the DIP switch 1 with reference to a table on a manual, a procedure which is tedious and time-consuming.

After the DIP switch has been operated to change functions, the user cannot ascertain whether the changeover switch has been selected properly unless actual printing is effected. Accordingly, the problem remains which keeps the user doubtful about the selection of the changeover switch.

The changeover of the printer functions is not frequently repeated, but may be effected only once at the time the printer power is switched on. The selected function is seldom changed over once it has been preset, and some printers are designed such that the selected functions cannot be changed after the printer has started printing operation. Therefore, it is costly to provide a function changeover switch which is not used during printing operation.

SUMMARY OF THE INVENTION

It is an object of the present invention to provide a printer having a function switching capability which is easy to handle and inexpensive to achieve.

According to the present invention, there is provided a printer including a carriage supporting a print head and movable across print paper for enabling the print head to print on the print paper, a fixed frame, a switch device mounted on one of the carriage and the fixed frame, the switch device being composed of a light transmission means and a light blocking means for blocking light passing through the light transmission means, a sensor means on the other of the carriage and the fixed frame for sensing light passing through the switch device to produce an electric signal, and a means for reading the electric signal as information indicative of printer functions in response to movement of the carriage.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
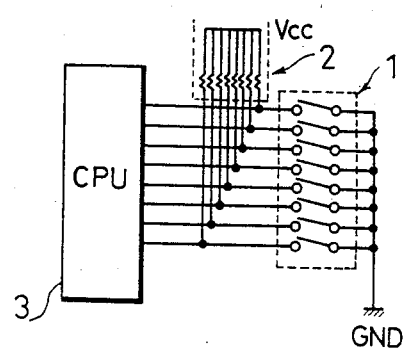
FIG. 1 is a circuit diagram of a conventional DIP switch for use as a function changeover switch in a printer.
Figure 2:
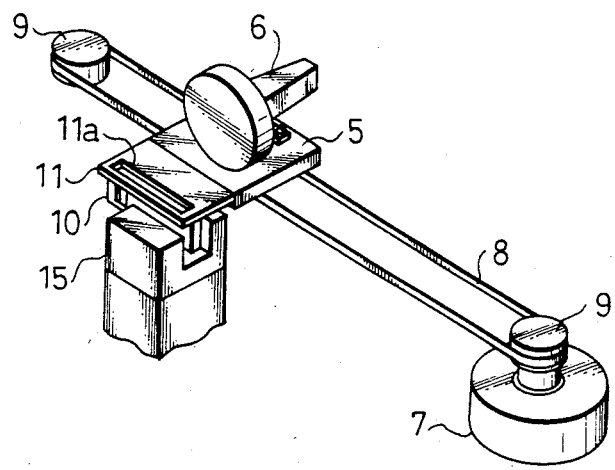
FIG. 2 is a perspective view of a printer according to the present invention.
Figure 3:
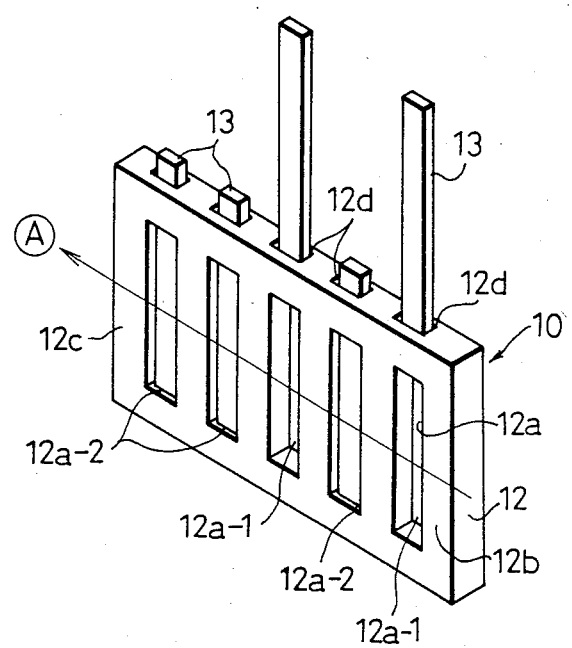
FIG. 3 is a perspective view of a card-type switch device.

As shown in FIGS. 2 and 3, a carriage 5 supports thereon a print head 6 and moves the print head 6 across print paper in response to rotation of a step motor 7. Rotative power of the step motor 7 is transmitted by a wire 8 to the carriage 5, the wire 8 being trained around pulleys 9 and having ends fixed to the carriage 5. An attachment base 11 which supports a card-type switch device 10 is angularly movably mounted by a hinge or the like to a rear end of the carriage 5. The angular movability of the attachment base 11 allows the card-type switch device 10 to be operated or replaced easily even in a small-size printer. The attachment base 11 has a slot 11a through which slide bars 13 (described later) are vertically movable, so that the slide bars 13 can be operated with the card-type switch device 10 attached in place.

As shown in FIG. 3, the card-type switch device 10 is composed of a switch device body 12 made of synthetic resin or aluminum alloy and having a plurality of windows or a light transmission means 12a for allowing light to be transmitted therethrough. A light blocking means or slide bars 13 are slidably inserted through holes 12d communicating with the windows 12a, respectively. The windows 12a are selectively openable and closable by sliding the slide bars 13 for controlling light passing through the windows 12a. A substantially U-shaped fixing base 15 has therein a photosensor 16 (FIG. 4) composed of a photodiode 16a and a phototransistor 16b. As the carriage 5 is moved along, the card-type switch device 10 moves between the photodiode 16a and the phototransistor 16b.

Figure 4:
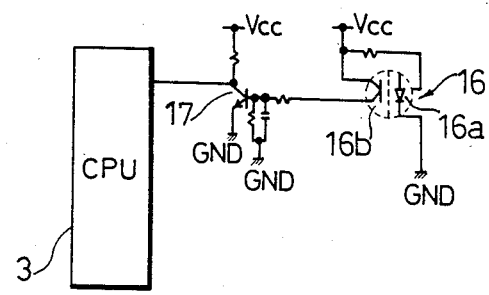
FIG. 4 is a circuit diagram of a photosensor circuit and a CPU.

FIG. 4 shows a photosensor circuit and a CPU. As described above, the photosensor 16 composed of the photodiode 16a and the photosensor 15b is mounted in the fixing base 15. An output signal from the phototransistor 16b is delivered through an RC filter which removes noise from the signal, and a signal from the RC filter is shaped by a transistor 17 into a rectangular-pulse signal applied to the CPU 3.

When a power supply of the printer of the invention is turned on, the motor 7 is energized to move the carriage 5 at a constant speed, and upon such movement the card-type switch device 10 moves across between the photodiode 16a and the phototransistor 16b. The photosensor 16 then reads information indicated by the windows 12a which are selectively open. Based on the information thus read, various functions of the printer, such as a printing speed, a printing width, a parity check, and the like, are initialized. If the user of the printer wants to get selected functions printed, then the printer power supply should be turned on while an LF key or an FF key is being depressed.

The manner will be described in which information indicated by the card-type switch device 10 of FIG. 3 is read by the photosensor 16 when the printer power supply is turned on.

When the printer power supply is turned on, the CPU 3 controls the motor 7 so that light emitted from the photodiode 16a shown in FIG. 4 scans the windows 12a of the card-type switch device 10 in the direction of the arrow A. Open windows 12a-1 allow light from the photodiode 16a to be converted by the phototransistor 16b into an electric signal which is shaped by the transistor 17 into a rectangular-pulse signal applied to the CPU 3.

The CPU 3 detects light blocking portions such as 12b, 12c from the rectangular-pulse signal, and calculates functions assigned to closed windows 12a-2, 12a-2, 12a-2 with reference to the leading and trailing light blocking portions 12b, 12c. Then, the CPU 3 automatically selects the calculated functions.

Therefore, the user of the printer reads information functions of the windows 12a, vertically moves the slide bars 13 in desired windows 12a or removes the slide bars 13 from windows 12a-1 to be opened, thus selecting new functions.

Since the card-type switch device 10 transmits light, it is more resistant to dirt-dependent noise and allows information to be read more reliably than reflective switch devices employing marked cards.

By turning on the power supply while the LF key of the printer is being depressed, the information indicated by the card-type switch device can be printed to effect self-checking which enables the user to confirm the functions that have been changed.

With the present invention, the printer has a photosensor and a switch device having openable and closable windows, and printer functions can be selected by information indicated by selectively opened windows and read by the photosensor. There are no DIP switch required for the changeover of printer functions, and hence no connector lines from the DIP switch. Therefore, the changeover mechanism is less costly to construct. Function changeover can easily be achieved since it can be carried out simply by opening and closing the windows. Since the switch device is of the light transmission type, light transmitted therethrough is not adversely affected if the switch device is dirty or curved, with the result that information as indicated can be read without error and reliability is increased.

Although a certain preferred embodiment has been shown and described, it should be understood that many changes and modifications may be made therein without departing from the scope of the appended claims.

What is claimed is:

1. A printer comprising:
 (a) a carriage supporting a print head and movable across print paper for enabling the print head to print on the print paper;
 (b) a fixed frame;
 (c) a switch device mounted on one of said carriage and said fixed frame, said switch device being composed of light transmission means and light blocking means for blocking light passing through said light transmission means;
 (d) sensor means on the other of said carriage and said fixed frame for sensing light passing through said switch device to produce an electric signal; and
 (e) means for reading said electric signal as information indicative of printer functions in response to movement of said carriage.

2. A printer according to claim 1, wherein said light transmission means comprises a body and a plurality of parallel spaced windows defined in said body, said light blocking means comprising a plurality of slide bars selectively slidable into and out of said windows.

3. A printer according to claim 1, wherein said sensor means comprises a phototransistor for detecting light passing through said light transmission means and said reading means comprising a CPU for receiving an electric signal dependent on the detected light.

* * * * *